(12) United States Patent
Pramod

(10) Patent No.: US 11,218,096 B2
(45) Date of Patent: Jan. 4, 2022

(54) FEEDFORWARD CONTROL OF MULTIPHASE PERMANENT MAGNET DIRECT CURRENT MOTOR DRIVES

(71) Applicant: Steering Solutions IP Holding Corporation, Saginaw, MI (US)

(72) Inventor: Prerit Pramod, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 102 days.

(21) Appl. No.: 16/699,543

(22) Filed: Nov. 29, 2019

(65) Prior Publication Data
US 2021/0167703 A1    Jun. 3, 2021

(51) Int. Cl.
| H02P 6/182 | (2016.01) |
| H02P 6/28 | (2016.01) |
| H02K 3/28 | (2006.01) |
| B62D 5/04 | (2006.01) |
| H02P 23/14 | (2006.01) |

(52) U.S. Cl.
CPC ............ *H02P 6/182* (2013.01); *B62D 5/046* (2013.01); *H02K 3/28* (2013.01); *H02P 6/28* (2016.02); *H02P 23/14* (2013.01); *H02P 2207/05* (2013.01)

(58) Field of Classification Search
CPC .......... H02P 6/182; H02P 6/188; H02P 25/22; B62D 5/046; H02K 3/28; H02K 17/185
See application file for complete search history.

(56) References Cited

U.S. PATENT DOCUMENTS

| 6,831,477 B2 | 12/2004 | Fukusumi et al. |
| 6,986,688 B1 | 1/2006 | Jansen |
| 8,247,944 B2 | 8/2012 | Gebregergis et al. |
| 10,340,828 B2 | 7/2019 | Pramod et al. |
| 10,404,197 B2 | 9/2019 | Pramod et al. |
| 2002/0084764 A1 | 7/2002 | Chen et al. |
| 2003/0045981 A1 | 3/2003 | Kifuku et al. |
| 2003/0179004 A1 | 9/2003 | Fukusumi et al. |
| 2004/0021437 A1 | 2/2004 | Maslov et al. |
| 2004/0222754 A1* | 11/2004 | Ochiai ...................... H02P 1/54 318/105 |
| 2005/0017664 A1* | 1/2005 | Takahashi .............. B62D 6/008 318/432 |

(Continued)

OTHER PUBLICATIONS

U.S. Appl. No. 16/124,727, filed Sep. 7, 2018 and titled "Fault Tolerant Permanent Magnet DC Motor Drives".

(Continued)

*Primary Examiner* — Said Bouziane
(74) *Attorney, Agent, or Firm* — Dickinson Wright PLLC

(57) ABSTRACT

Systems and methods, for controlling an output torque of a permanent magnet direct current (PMDC) machine includes a PMDC motor that includes a plurality of winding sets and a controller. The PMDC motor is configured to generate the output torque. The controller is configured to: determine, for a first winding set of the PMDC motor, a first voltage command based on a first input torque command signal and a back-EMF drop voltage of the first winding set; determine, for a second winding set of the PMDC motor, a second voltage command based on a second input torque command signal; and selectively control the PMDC motor according to the first voltage command and the second voltage command.

20 Claims, 6 Drawing Sheets

(56) References Cited

U.S. PATENT DOCUMENTS

| | | |
|---|---|---|
| 2005/0253479 A1 | 11/2005 | Lakerdas et al. |
| 2008/0067960 A1 | 3/2008 | Maeda et al. |
| 2008/0112697 A1 | 5/2008 | Kim |
| 2009/0000857 A1 | 1/2009 | Sugiyama et al. |
| 2009/0079373 A1 | 3/2009 | Nagase et al. |
| 2009/0254300 A1 | 10/2009 | Schneider et al. |
| 2011/0057593 A1 | 3/2011 | Williams et al. |
| 2011/0221365 A1 | 9/2011 | Gallegos-Lopez |
| 2012/0001506 A1 | 1/2012 | Orban et al. |
| 2012/0086297 A1 | 4/2012 | Makino |
| 2012/0169263 A1 | 7/2012 | Gallegos-Lopez et al. |
| 2013/0221885 A1 | 8/2013 | Hunter |
| 2014/0028230 A1 | 1/2014 | Yamaguchi et al. |
| 2014/0149000 A1 | 5/2014 | Tamura et al. |
| 2014/0200767 A1 | 7/2014 | Mikamo et al. |
| 2014/0207335 A1 * | 7/2014 | Mikamo ................ B62D 5/046 701/41 |
| 2014/0217946 A1 * | 8/2014 | Kume ...................... H02P 6/08 318/497 |
| 2015/0198934 A1 | 7/2015 | Kaku et al. |
| 2015/0198935 A1 | 7/2015 | Kaku et al. |
| 2015/0239491 A1 | 8/2015 | Bolourchi et al. |
| 2016/0072416 A1 * | 3/2016 | Hirotani ................ H02P 25/022 318/400.02 |
| 2017/0297616 A1 * | 10/2017 | Kikuchi .................. B62D 5/04 |
| 2018/0062547 A1 * | 3/2018 | Dutta ..................... H02P 21/14 |
| 2018/0112907 A1 | 4/2018 | Harrell et al. |
| 2018/0148087 A1 | 5/2018 | Wang et al. |
| 2018/0294755 A1 * | 10/2018 | Mori ....................... H02P 21/22 |
| 2019/0135331 A1 | 5/2019 | Pramod et al. |

OTHER PUBLICATIONS

U.S. Appl. No. 16/152,970, filed Oct. 5, 2018 and titled "Inverter Commutation Techniques for Five-Phase Synchronous Motor Drives".

* cited by examiner

US 11,218,096 B2

FEEDFORWARD CONTROL OF MULTIPHASE PERMANENT MAGNET DIRECT CURRENT MOTOR DRIVES

TECHNICAL FIELD

This disclosure relates to facilitating feedforward torque and current control of multiphase permanent magnet direct current motors.

BACKGROUND

Permanent magnet direct current (PMDC) motors (also called brushed DC motors) are widely employed for motion control applications such as in electric power steering (EPS) systems, power tools, and the like. PMDC motors with multiple winding sets have been developed to provide redundancy in EPS applications. While these motors resemble their typical single winding counterparts, most of the commonly employed winding schemes result in inductive coupling between the different winding sets. This results in the current, and thus torque, control behavior of these motors to be different from single winding motors. As such, existing control schemes are not extendable to multiphase PMDC motors.

The torque control of PMDC motor drives is performed through current regulation utilizing measured current feedback (through current measurement circuitry). For example, feedforward current and torque control is one mode of controlling PMDC motor drives. To implement feedforward control of the PM DC motor, an accurate model of the PMDC motor (including nonlinearities such as brush drop voltage) is required.

SUMMARY

This disclosure relates generally to facilitating feedforward torque and current control of multiphase permanent magnet direct current (PMDC) motors.

An aspect of the disclosed embodiments includes a system for controlling an output torque of a PMDC machine. The system includes a PMDC motor that includes a plurality of winding sets and a controller. The PMDC motor is configured to generate the output torque. The controller is configured to: determine, for a first winding set of the PMDC motor, a first voltage command based on a first input torque command signal and a back-EMF drop voltage of the first winding set; determine, for a second winding set of the PMDC motor, a second voltage command based on a second input torque command signal; and selectively control the PMDC motor according to the first voltage command and the second voltage command.

Another aspect of the disclosed embodiments includes a controller for controlling an output torque of a PMDC motor. The controller is configured to: determine, for a first winding set of the multiphase PMDC motor, a first voltage command based on a first input torque command signal and a back-EMF drop voltage of the first winding set; determine, for a second winding set of the multiphase PMDC motor, a second voltage command based on a second input torque command signal; and selectively control the multiphase PMDC motor according to the first voltage command and the second voltage command.

Another aspect of the disclosed embodiments includes a method for controlling an output torque of a PMDC motor. The method includes determining, for a first winding set of the multiphase PMDC motor, a first voltage command based on a first input torque command signal and a back-EMF drop voltage of the first winding set. The method also includes determining, for a second winding set of the multiphase PMDC motor, a second voltage command based on a second input torque command signal. The method also includes selectively controlling the multiphase PMDC motor according to the first voltage command and the second voltage command.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
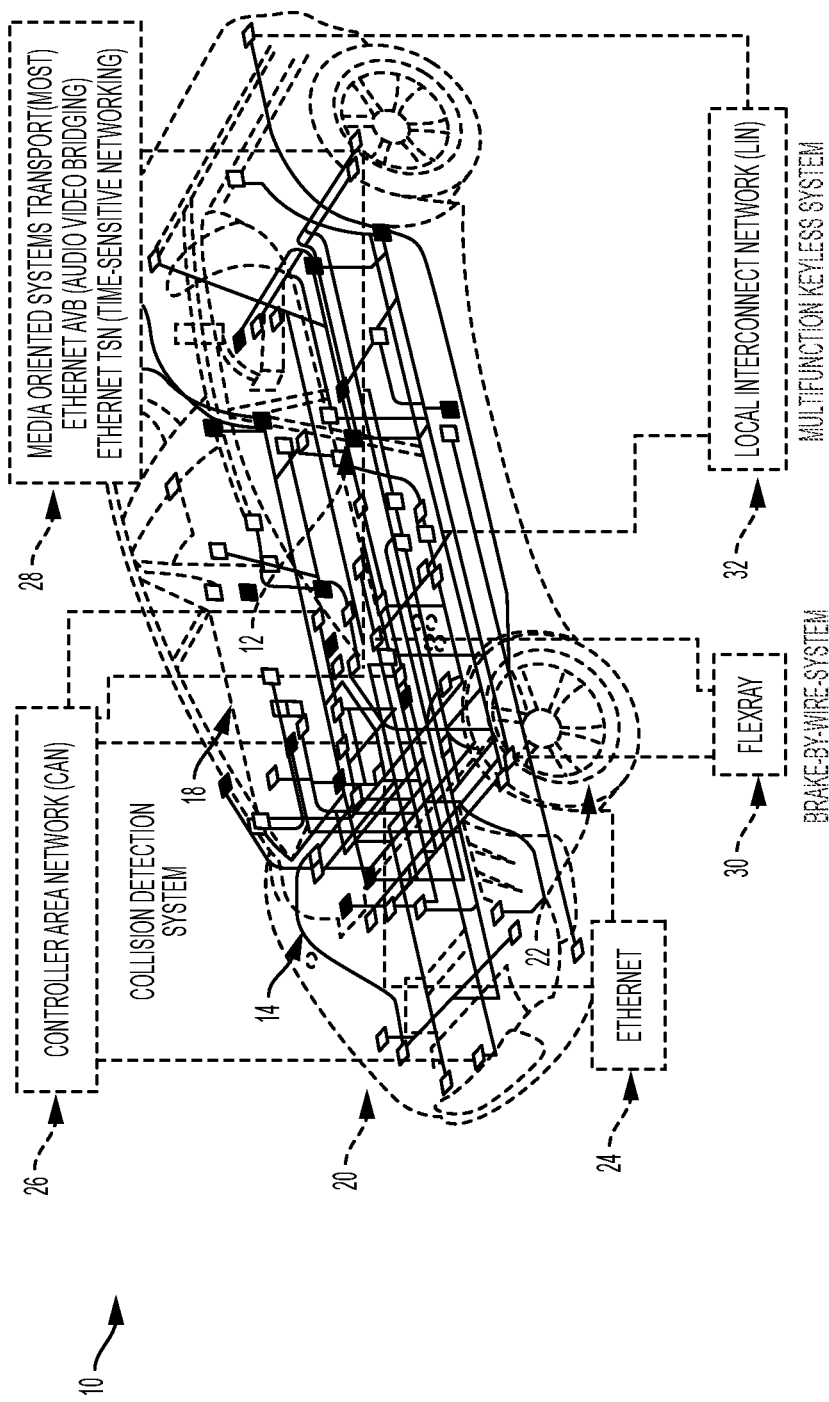
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, permanent magnet direct current (PM DC) motors (also called brushed DC motors) are widely employed for motion control applications such as in electric power steering (EPS) systems, power tools, and the like. PMDC motors with multiple winding sets have been developed to provide redundancy in EPS applications. While these motors resemble their typical single winding counterpart, most of the commonly employed winding schemes result in inductive coupling between the different winding sets. This results in the current, and thus torque, control behavior of these motors to be different from single winding motors. As such, existing control schemes are not extendable to multiphase PMDC motors.

The torque control of PMDC motor drives is performed through current regulation utilizing measured current feedback (through current measurement circuitry). For example, feedforward current and torque control is one mode of controlling PMDC motor drives. Feedforward control is typically not prone to instabilities (due to open loop nature) and is noise free because current sensors are not usually required for implementation of feedforward control. Further, the noise transmission characteristics of feedforward control systems is lower as compared to other control systems. As such, it is beneficial to use feedforward current control to operate PMDC motors in applications, such as EPS systems, power tools, among others.

Accordingly, systems and methods, such as those described herein, that provide feedforward control of PMDC motor drives, may be desirable. To implement feedforward control of PMDC motor drives an accurate model of the PMDC motor (including nonlinearities such as brush drop voltage) is required. For example, in some embodiments, the systems and methods described herein may be configured to determine or compute a control signal (e.g., a voltage command) by utilizing an inverse mathematical model of the plant (or motor). In particular, the systems and methods described herein implement feedforward current (torque) control of multiphase PMDC motors (e.g., with at least two winding sets) based on a current command (reference) and a motor velocity signal that may be estimated or measured by a velocity sensor or by differentiating motor position obtained from a position sensor. In some embodiments, a machine model based controller may be based on a substantially similar model of a PMDC machine with estimated parameters. Additionally, or alternatively, a velocity parameter may be obtained directly from a sensor (position or velocity sensor) or an observer output. In some embodiments, transformed machine model based controller may compute voltage command using an inverse of a modified machine model. The voltage command may be mathematically transformed for application at a PMDC machine terminals.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20 but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable configuration such as a dual winding version.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network component (CAN) 26, a media oriented systems transport component (MOST) 28, a FlexRay component 30 (e.g., brake-by-wire system, and the like), and a local interconnect network component (LIN) 32. In some embodiments, the vehicle 10 is configured for domain control with over-the-air programming support. For example, as described, the vehicle 10 may receive updates for any suitable software component of the vehicle 10, via the Internet (e.g., or other suitable network). The vehicle 10 may update or change software components based on the update. The vehicle 10 may include additional or fewer features than those generally illustrated and/or disclosed herein.

In some embodiments, the vehicle 10 may include an electric power steering (EPS) system that utilizes PMDC motors. PMDC motors may include a stator, a rotor, and a commutator. Typically, the stator contains magnet poles, and the rotor is an armature, which carries windings. The commutator is attached to brushes and slip rings, which allow mechanical commutation of a PMDC machine. The brushes are connected to phase-lead terminals through which voltages can be applied to the PMDC machine. The term "machine" is used herein interchangeably with the term "motor" and refers solely to a PMDC motor (e.g., a PMDC motor 520 depicted in FIGS. 3-5) of a system (e.g., a motor control system 300 depicted in FIGS. 2-5).

The mathematical model of a single wound PMDC machine is composed of two governing equations which relate the voltage, current, and (electromagnetic) torque of the machine as follows.

$$v = e_g + Ri_a + L\frac{di_a}{dt} + v_b$$

$$e_g = K_e \omega_m$$

$$T_e = K_e i_a$$

where v, $i_a$ and $T_e$ are input voltage, current, and electromagnetic torque of the machine respectively, $K_e$, R, and L represent the machine back-EMF (and torque) constant, motor circuit resistance and inductance respectively, $e_g$ represents a back-EMF drop voltage, and $v_b$ is a nonlinear brush drop voltage and is a function of the current as follows.

$$v_b = \sigma(i_a)V_0\left(1 - e^{-\left|\frac{i_a}{I_0}\right|}\right)$$

where $V_0$ and $I_0$ are brush drop parameters. In general, all machine parameters are nonlinear functions of operating temperature and magnetic saturation (caused by high current operation).

Further, the electrical parameters of the motor, namely the back-EMF constant or torque constant $K_e$, resistance R, and inductance L vary dynamically with the operating condition of the motor. The variation of $K_e$ for a given magnet temperature $\theta_m$ can be expressed as:

$$K_e = \gamma_k(K_{en}(1 + \alpha_m(\theta_m - \theta_n)))$$

where $\gamma_k$ is a scaling factor accounting for magnetic saturation and is a function of motor current $i_a$, $K_{en}$, is the nominal (unsaturated) value of $K_e$ at a temperature of $\theta_n$, and $\alpha_m$ is a constant representing a thermal coefficient of the permanent magnet material used in the motor.

The inductance of the motor can be described by the equation, $$L = \gamma_L L_n$$

where $\gamma_L$ is a scaling factor for inductance based on the magnetic saturation characteristics of the motor and is a function of the motor current $i_a$, and $L_n$ is the nominal (unsaturated) inductance value.

Further yet, the motor circuit resistance can be described by the equation:

$$R = R_f(1 + \alpha_f(\theta_f - \theta_n)) + R_m(1 + \alpha_w(\theta_w - \theta_n))$$

where $R_f$ is a nominal value of field-effect transistor (FET) resistance, $\alpha_f$ is a constant representing a thermal coefficient of FETs, $\theta_f$ is a temperature of the FETs, $\theta_n$ is a nominal temperature at which $R_f$ is measured, $R_m$ is a nominal value of motor resistance, $\alpha_w$ is a constant representing a thermal coefficient of windings, $\theta_w$ is a temperature of the windings, $\theta_n$ is a nominal temperature at which $R_m$ is measured.

The equation above for the resistance provides the motor circuit resistance rather than the resistance of the motor windings only. In some embodiments, motor parameters are continuously estimated in real-time, or near real-time, which may result in improved estimation of the signals used by the motor control system 300.

From a control system design perspective the PMDC motor 520 is a plant, and the time domain model of the PMDC motor 520, as described, may be transformed into the s-domain as:

$$V(s) = (Ls + R)I_a(s) + E_g(s) + V_B(s)$$

Brushes of a PMDC machine are typically susceptible to mechanical wear. The mechanical wear can result in a failure of the motor after which the machine can no longer be operated. In an EPS system setting, not using the PMDC motor results in loss of assist to an operator of the vehicle 10. To address this challenge, PMDC motors with multiple winding sets have been developed to provide redundancy in systems.

Figure 2:
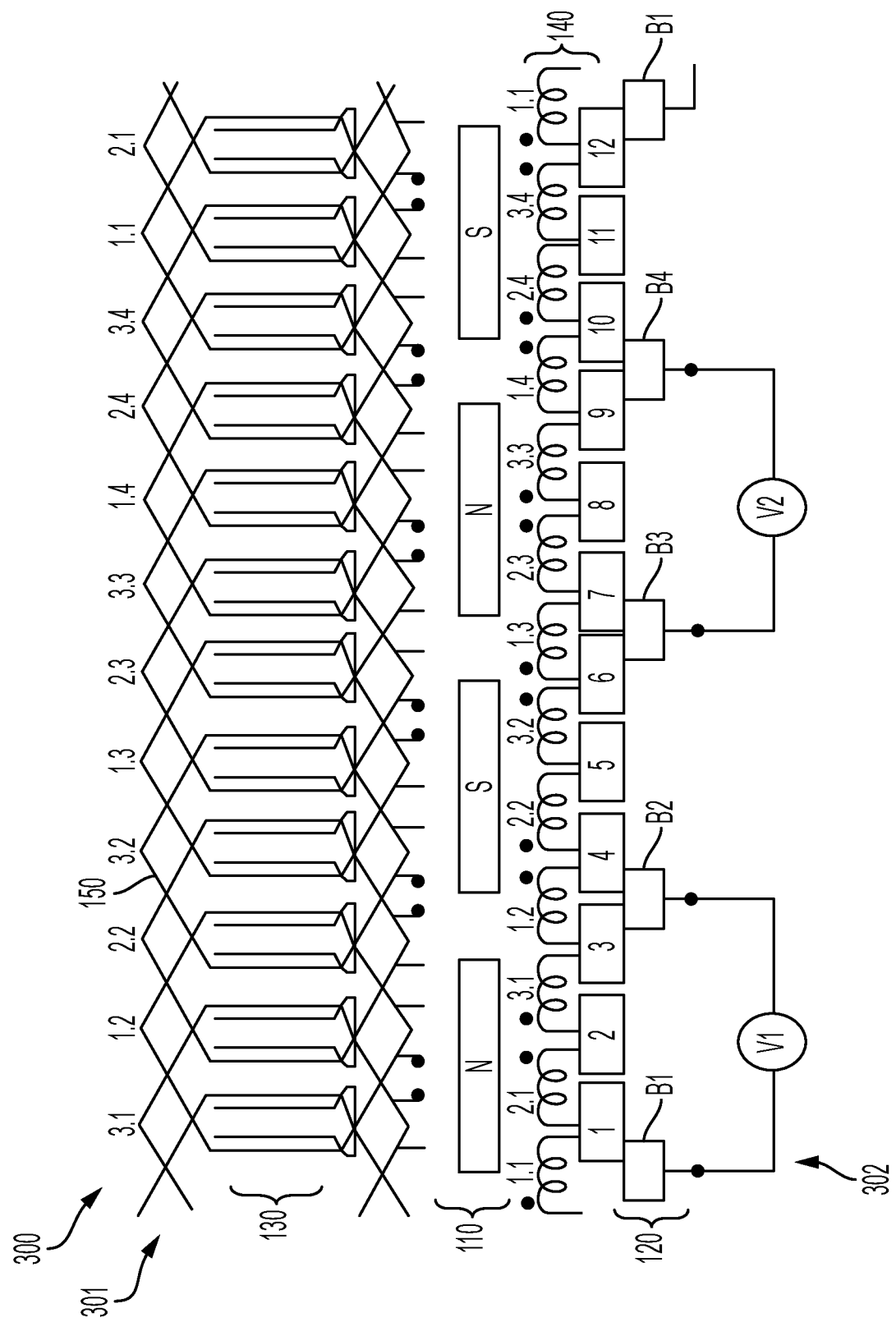
FIG. 2 generally illustrates an example multi-winding permanent magnet direct current (PMDC) machine according to the principles of the present disclosure.

FIG. 2 generally illustrates the motor control system 300 including a multi-winding PMDC machine according to the principles of the present disclosure. More specifically, the motor control system 300 is an example of a "dual-wound PMDC machine" including four stator poles (i.e., two magnet pole pair (N and S) 110, two brush pairs (B1-B4) 120, twelve commutator plates and rotor slots (i.e., gaps between rotor poles) 130, and commutator segments (e.g., 1.1-1.2, 1.3-1.4, 2.1-2.2, 2.3-2.4, 3.1-3.2, and 3.3-3.4) 140 corresponding to each, with a distributed lap winding 150 having a diametrical pitch. It should be noted that the technical solutions described herein are not limited to the motor control system 300 with configuration shown in FIG. 2. Rather, the motor control system 300, in other examples, can include additional brush pairs 120 and/or magnet pole pairs 110. Alternatively, or additionally, the motor control system 300, in other examples, may include a different number of rotor slots 130 or a different manner of winding for the commutator segments 140.

While multi-winding PMDC motors resemble their typical single winding counterpart, most of the commonly employed winding schemes result in inductive coupling between the different winding sets. This results in the current, and thus torque, control behavior of these motors to be different from single winding motors. As such, existing control schemes for single-winding PMDC motors are not extendable to multiphase PMDC motors. The torque control of PMDC motor drives is performed through current regulation utilizing measured current feedback (through current measurement circuitry). For example, feedforward current and torque control is one mode of controlling PMDC motor drives. To implement feedforward control of the PMDC motor an accurate model of the PMDC motor (including nonlinearities such as brush drop voltage) is required.

Figure 3:
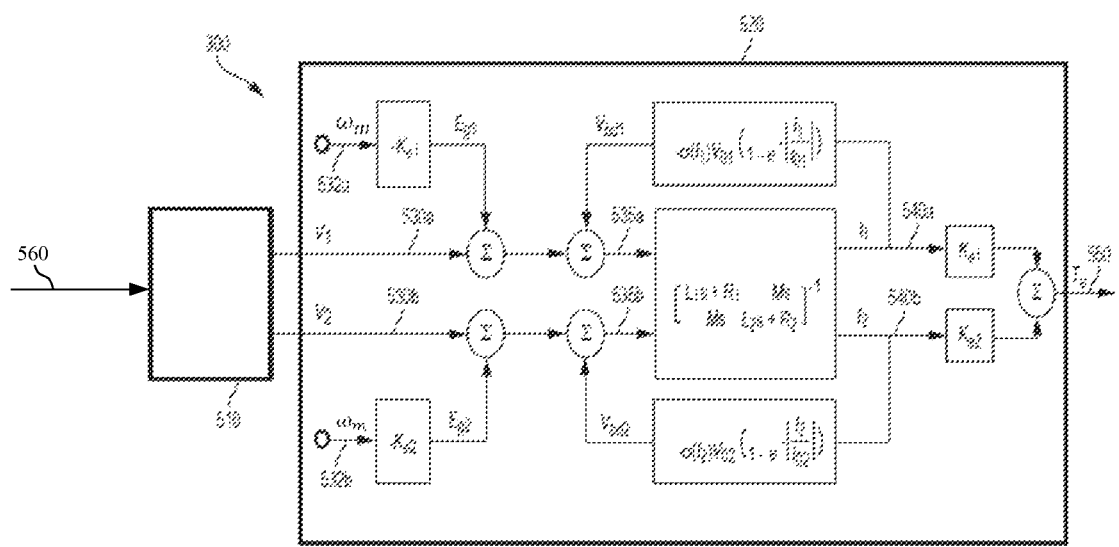
FIG. 3 generally illustrates a block diagram of a dual-winding PMDC machine using a mathematical model according to the principles of the present disclosure.

FIG. 3 generally illustrates a block diagram of a dual-winding PMDC machine using a mathematical model according to the principles of the present disclosure. The view of the motor control system 300 in FIG. 3 includes a controller 510 and a PMDC motor 520, the motor 520 includes dual windings in this case. The controller 510 may include any suitable controller, such as a vehicle electronic control unit, a processor, or any other suitable controller, such as those described herein. The controller 510 may be in communication with memory. The memory may include any suitable non-volatile or volatile memory. The memory may include a memory array, a memory storage device, or any other suitable memory. The memory may include instructions that, when executed by the controller 510, cause the controller 510 to, at least, control PMDC motors employed by systems of the vehicle 10. Additionally, or alternatively, the instructions, when executed by the controller 510, may cause the controller 510 to perform various other functions of the vehicle 10.

For the dual-winding PMDC motor 520 two input voltage, $V_1$ 530a and $V_2$ 530b, may be based on voltage commands generated by the controller 510, for example through a power controller (not shown). It should be noted that while ideally the voltage commands generated by the controller 510 are equal to the input voltages $V_1$ 530a and $V_2$ 530b of the PMDC motor 520, in practice the values may be slightly different due to, for instance, nonlinearities in the power converter circuitry. As discussed in more detail with reference to FIGS. 4 and 5, the controller 510 may determine the voltage commands based on one or more input torque command signals (e.g., input current commands ($I_1^*$) 402a and ($I_2^*$) 402b of FIGS. 4 and 5). The one or more input torque command signals may be generated based on an input torque ($T_e^*$) 560.

Further, the voltage commands are modified because of back-EMFs ($\omega_m$) for each respective winding. The back-EMFs based on a velocity of the motor 520. For example, a first back-EMT voltage ($\omega_m$) 532a of the first winding set of the motor 520 is based on the motor velocity and a first back-EMF (and torque) constant $K_{e1}$ of the first winding set. Similarly, a second back-EMT voltage ($\omega_m$) 532b of the second winding set of the motor 520 is based on the motor velocity and a second back-EMF (and torque) constant $K_{e2}$ of the second winding.

The voltage commands 530a-b are further modified because of the brush drop voltage ($V_{bd}$) of each winding. For example, the first voltage $V_1$ 530a is added with the brush drop voltage of the first winding, and the second voltage $V_2$ is added with the brush drop voltage of the second winding. The voltages get converted into the currents 540a and 540b for each winding based on the inductance and resistance of each winding, and the current further produces the resultant torque ($T_e$) 550 from the motor 520. The output torque 550 is proportional to the currents $I_1$ and $I_2$ based on the corresponding constants $K_{e1}$ and $K_{e2}$ for each winding. Further, a magnetic coupling represented by a mutual inductance (M) between the two windings further affects the currents produced by the voltage commands Because of the additional magnetic coupling between the phases of the dual-winding PMDC machine 300, the machine model of the machine 300 differs from that of the single-wound machine. For example, the mathematical model for the dual-wound PMDC machine 300 is given as follows:

$$V_1 = L_1 \dot{I}_1 + R_1 I_1 + K_{e1}\omega_m + \sigma(I_1)V_{01}\left(1 - e^{-\left|\frac{I_1}{I_{01}}\right|}\right) + M_{12}\dot{I}_2$$

$$V_2 = L_2 \dot{I}_2 + R_2 I_2 + K_{e2}\omega_m + \sigma(I_2)V_{02}\left(1 - e^{-\left|\frac{I_2}{I_{02}}\right|}\right) + M_{21}\dot{I}_1$$

$$T_e = K_{e1}I_1 + K_{e2}I_2$$

where $M_{12}=M_{21}=M$ represents the inductive coupling between the two phases. The mutual inductance terms ($M_{12}I_2$, and $M_{21}I_1$), in general, vary nonlinearly with the machine currents $I_1$ and $I_2$.

This model can be extended to an n-phase PMDC machine, where n represents a number of windings used (or a number of redundant machines included in the single PMDC machine). A general model of an n-phase machine may be expressed as follows:

$$V_1 = L_1 \dot{I}_1 + R_1 I_1 + K_{e1}\omega_m + \sigma(I_1)V_{01}\left(1 - e^{-\left|\frac{I_1}{I_{01}}\right|}\right) + M_{12}\dot{I}_2 + M_{13}\dot{I}_3 + \cdots + M_{1n}\dot{I}_n$$

$$V_2 = L_2 \dot{I}_2 + R_2 I_2 + K_{e2}\omega_m + \sigma(I_2)V_{02}\left(1 - e^{-\left|\frac{I_2}{I_{02}}\right|}\right) + M_{21}\dot{I}_1 + M_{23}\dot{I}_3 + \cdots + M_{2n}\dot{I}_n$$

$$\vdots$$

$$V_n = L_n \dot{I}_2 + R_n I_n + K_{en}\omega_m + \sigma(I_n)V_{0n}\left(1 - e^{-\left|\frac{I_n}{I_{0n}}\right|}\right) + M_{n1}\dot{I}_1 + M_{n2}\dot{I}_2 + \cdots + M_{n-1,n}\dot{I}_{n-1}$$

$$T_e = K_{e1}I_1 + K_{e2}I_2 + \cdots K_{en}I_n$$

where the mutual inductances are specified to be different for generalization. The mutual inductances for two winding sets (set a and b say) are equal (e.g., $M_{ab}=M_{ba}$).

For simplicity, the rest of the description is presented for a dual winding machine, which may be extended to a general n-phase machine. The voltage-current equations of the dual-wound machine may be represented in transfer matrix form as follows:

$$\begin{bmatrix} V_1 \\ V_2 \end{bmatrix} = \begin{bmatrix} L_1 s + R_1 & Ms \\ Ms & L_2 s + R_2 \end{bmatrix}\begin{bmatrix} I_1 \\ I_2 \end{bmatrix} + \begin{bmatrix} K_{e1}\omega_m \\ K_{e2}\omega_m \end{bmatrix} + \begin{bmatrix} V_{bd1} \\ V_{bd2} \end{bmatrix}$$

$$\begin{bmatrix} V_1 \\ V_2 \end{bmatrix} - \begin{bmatrix} K_{e1}\omega_m \\ K_{e2}\omega_m \end{bmatrix} - \begin{bmatrix} V_{bd1} \\ V_{bd2} \end{bmatrix} = \begin{bmatrix} L_1 s + R_1 & Ms \\ Ms & L_2 s + R_2 \end{bmatrix}\begin{bmatrix} I_1 \\ I_2 \end{bmatrix}$$

where the two brush drop terms are assumed to be independent of currents in order to generate the transfer matrix representation of the PMDC machine (because the transfer matrix representation in the frequency domain requires a linear time-invariant model in the time-domain). Thus, the output currents may be expressed in terms of the input voltages as follows:

$$\begin{bmatrix} I_1 \\ I_2 \end{bmatrix} = \begin{bmatrix} L_1 s + R_1 & Ms \\ Ms & L_2 s + R_2 \end{bmatrix}^{-1}\left(\begin{bmatrix} V_1 \\ V_2 \end{bmatrix} - \begin{bmatrix} K_{e1}\omega_m \\ K_{e2}\omega_m \end{bmatrix} - \begin{bmatrix} V_{bd1} \\ V_{bd2} \end{bmatrix}\right) =$$

$$\frac{1}{\Delta(s)}\begin{bmatrix} L_2 s + R_2 & -M \\ -M & L_1 s + R_1 \end{bmatrix}\left(\begin{bmatrix} V_1 \\ V_2 \end{bmatrix} - \begin{bmatrix} K_{e1}\omega_m \\ K_{e2}\omega_m \end{bmatrix} - \begin{bmatrix} V_{bd1} \\ V_{bd2} \end{bmatrix}\right)$$

$$\Delta(s) = (L_1 s + R_1)(L_2 s + R_2) - s^2 M^2 = (L_1 L_2 - M^2)s^2 + (L_1 R_2 + L_2 R_1)s + R_1 R_2$$

When the winding arrangement is symmetrical and the two brush pairs are similar, the above model may be simplified to assume that the half-machines are identical (e.g., the self-inductances, resistances, voltage constants and brush drop parameters are equal).

Thus, in the dual-winding PMDC machine 300, the controller 510 uses both the windings concurrently to generate the output torque 550 by generating voltage commands that cause the voltages 530a-b such that the resulting currents result in the output torque 550. The controller 510 generates voltage commands 530a-b based on the output torque 550 that is to be generated by the motor 520. In case one of the windings fails, for example the first winding, the second voltage command 530b causes the second winding to continue to generate corresponding current 540b resulting in at least a partial output torque 550.

Alternatively, or additionally, the controller 510 generates only a single voltage command to cause an input voltage, for example the first voltage 530a, to generate the output torque using only the first winding. In case of a failure in the first winding, the controller 510 subsequently uses the second winding to generate the second voltage command causing a second input voltage $V_2$ 530b to generate the output torque 550.

The above model is extendible to an n-winding PMDC machine (instead of just the dual-winding), where the controller 510 uses more than two voltage commands $V_1$-$V_n$ for n-windings, each resulting in corresponding currents $I_1$-$I_n$, and which together cause the motor to generate the output torque 550.

It should be noted that embodiments described herein for feedforward control of multi-phase PMDC motors are applicable in any application using PMDC motors, such as watercrafts, power tools, rotor pumps, and any other such applications. PMDC motor drives are extensively used in industry for low-cost applications. Typically, feedback current control techniques are used for the current and torque control of PMDC machines. The technical solutions described herein facilitate using feedforward control and thus providing several advantages. For example, using feedforward control does not require current sensors when position or velocity sensors are available, providing cost savings. Further, feedforward control reduces instability due to open loop nature of motor control system. Further yet, feedforward control provides for fault tolerant control operation of PMDC based drive system. Additional advantages will be readily understood by person skilled in the art. The technical solutions described herein provide different configurations of feedforward control of PMDC motors that may be utilized for different applications.

Feedforward current control uses motor velocity for current control. While motor velocity may be measured using velocity sensors, or obtained by differentiating position signals measured by position sensors, it may also be estimated using observers.

Figure 4:
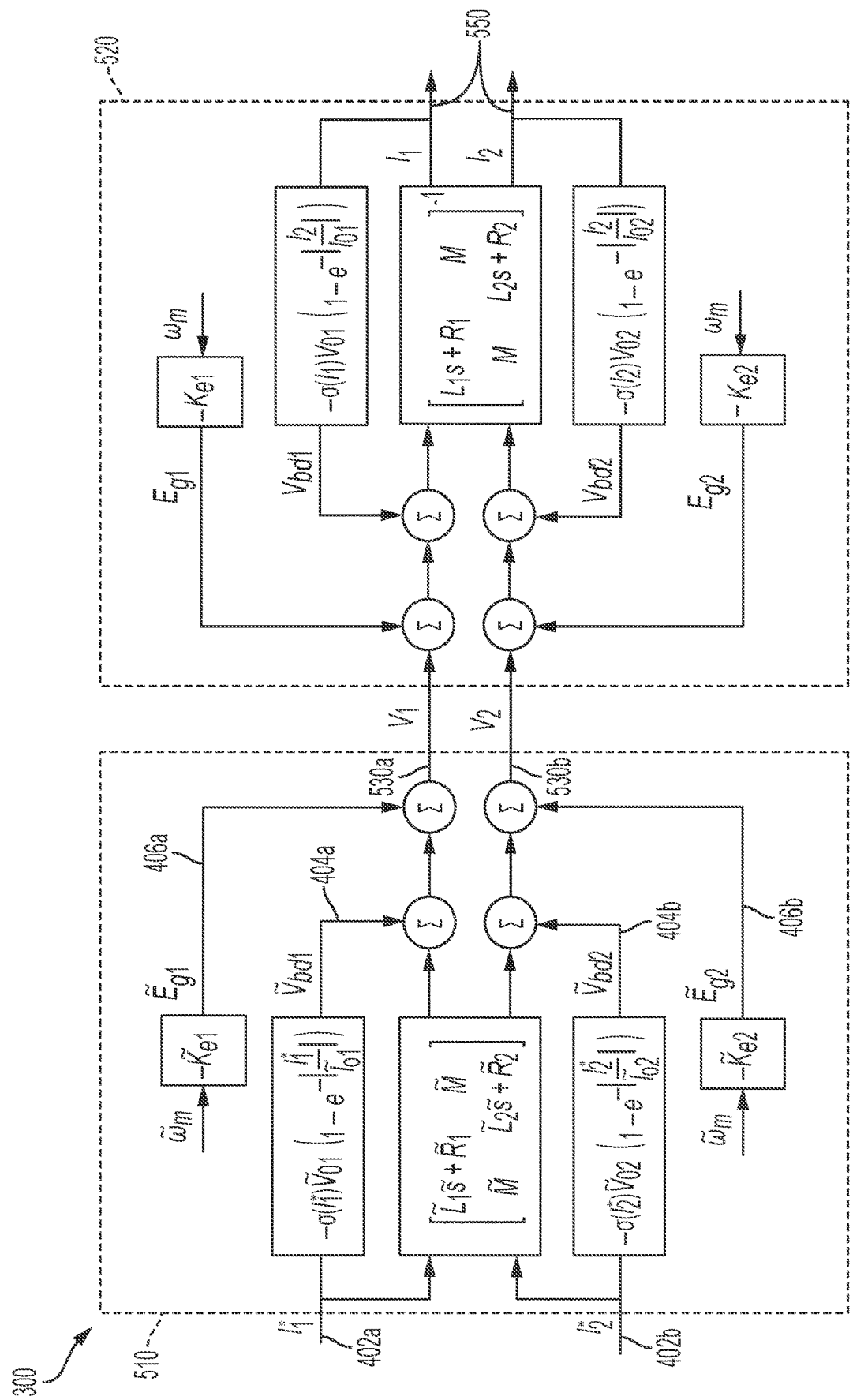
FIG. 4 generally illustrates a block diagram of a system for feedforward current and torque control according to the principles of the present disclosure.

FIG. 4 generally illustrates a block diagram of a system for feedforward current (and torque) control according to the principles of the present disclosure. In FIG. 4, the motor control system 300 facilitates feedforward control of the PMDC motor 520 and accordingly controls the torque output of the PMDC motor 520. In some embodiments, the motor control system 300 includes a feedforward current controller 510, among other components. The present disclosure uses the term 'motor control system' to refer to the feedforward current controller 510 and the PMDC motor 520. In some embodiments, the controller 510 controls the torque output 550 of the PMDC motor 520 by computing voltages using an inverse of the machine model of the PMDC motor 520 with estimated parameters and commanded current. Any parameters shown in FIG. 4 with a tilde indicates that the parameters may be estimated. The parameters may be estimated in real-time by exploiting the temperature and magnetic saturation characteristics of the different parts of the PMDC motor 520.

As depicted, the voltage command 530a is determined based on an input current command ($I_1^*$) 402a, an estimated brush drop voltage ($\tilde{V}_{bd1}$) 404a, and an estimated back-EMF drop voltage ($\tilde{E}_{g1}$) 406a. The voltage command 530b is determined based on an input current command ($I_2^*$) 402b, an estimated brush drop voltage ($\tilde{V}_{bd2}$) 404b, and an estimated back-EMF drop voltage ($\tilde{E}_{g2}$) 406b.

The controller 510 generates the estimated brush drop voltages 404a and 404b using the expressions:

$$\tilde{V}_{bd1} = -\sigma(I_1^*)\tilde{V}_{01}\left(1 - e^{-\left|\frac{I_1^*}{I_{01}^*}\right|}\right)$$

$$\tilde{V}_{bd2} = -\sigma(I_2^*)\tilde{V}_{02}\left(1 - e^{-\left|\frac{I_2^*}{I_{02}^*}\right|}\right)$$

where $\tilde{V}_{01}$, $\tilde{V}_{02}$, $I_1^*$ and $I_2^*$ are predetermined brush drop parameters, and $I_1^*$ and $I_2^*$ are the current commands. While the brush drop estimate is shown to be a function of the current command, it may also be estimated by replacing the current command by the measured motor current if motor current measurements are available.

Further, the controller 510 generates 530a and 530b based on estimates of the motor circuit resistance ($\tilde{R}$), and inductance ($\tilde{L}$) values, for the input current command ($I_1^*$) 402a and ($I_2^*$) 402b. The motor circuit resistance and inductance values are predetermined values, or estimated values. The approximation of the derivative term $\tilde{s}$ may be of a standard form such as $$\frac{s}{(\tau s + 1)^n}$$

which may then be discretized using different techniques such as backward difference, bilinear transform etc., or may be a direct digital derivative design with very targeted gain and phase responses for obtaining desired accuracy, complexity and noise transmission characteristics.

As depicted, the controller 510 generates the estimated back-EMF drop voltage ($\tilde{E}_{g1}$) 406a based on the predetermined back-EMF constant value and an estimated motor velocity ($\tilde{\omega}_m$). The motor velocity signal may be measured using a velocity sensor or obtained by differentiating motor position obtained from a position sensor. For example, a velocity sensing circuitry may monitor a motor velocity and provide the detected velocity as an input to the controller 510. The velocity sensing circuitry may have a transfer function that represents the velocity sensor dynamics. In some embodiments, a low pass filter may use a predetermined cutoff frequency that depends on the motor velocity.

In some embodiments, a feedforward control may utilize velocity measured by a position sensor. A position sensing circuitry may monitor a position of the motor and provide the detected position as an input to the controller 510. In some embodiments, the controller 510 includes a motor velocity module that calculates the estimated motor velocity based on the motor position signal. For example, the motor velocity module may calculate the motor velocity by differentiating the motor position signal. The motor position signal may provide an angular position of the motor shaft. The derivative implementation $\tilde{s}_p$ for obtaining the estimated motor velocity from the motor position signal may be of a form such as $$\frac{s}{(\tau s + 1)^n},$$

which may then be discretized using different techniques, such as backward difference or bilinear transform, or may be a direct digital derivative design with very targeted gain and phase responses for obtaining desired accuracy, complexity and noise transmission characteristics. It should be noted that in other examples the transfer function representing the position sensor dynamics, may differ from the first order transfer function shown in the figure depending on the specific sensor characteristics.

In some embodiments, brush drop parameters may be omitted from the motor control system 300 in an attempt to simplify from the controller 510. The motor control system 300 can be extended to any multiphase machine having higher than two winding sets by extending the mutual induction dependent voltage terms to include the cross-coupling between all winding sets of the multiphase machine.

Figure 5:
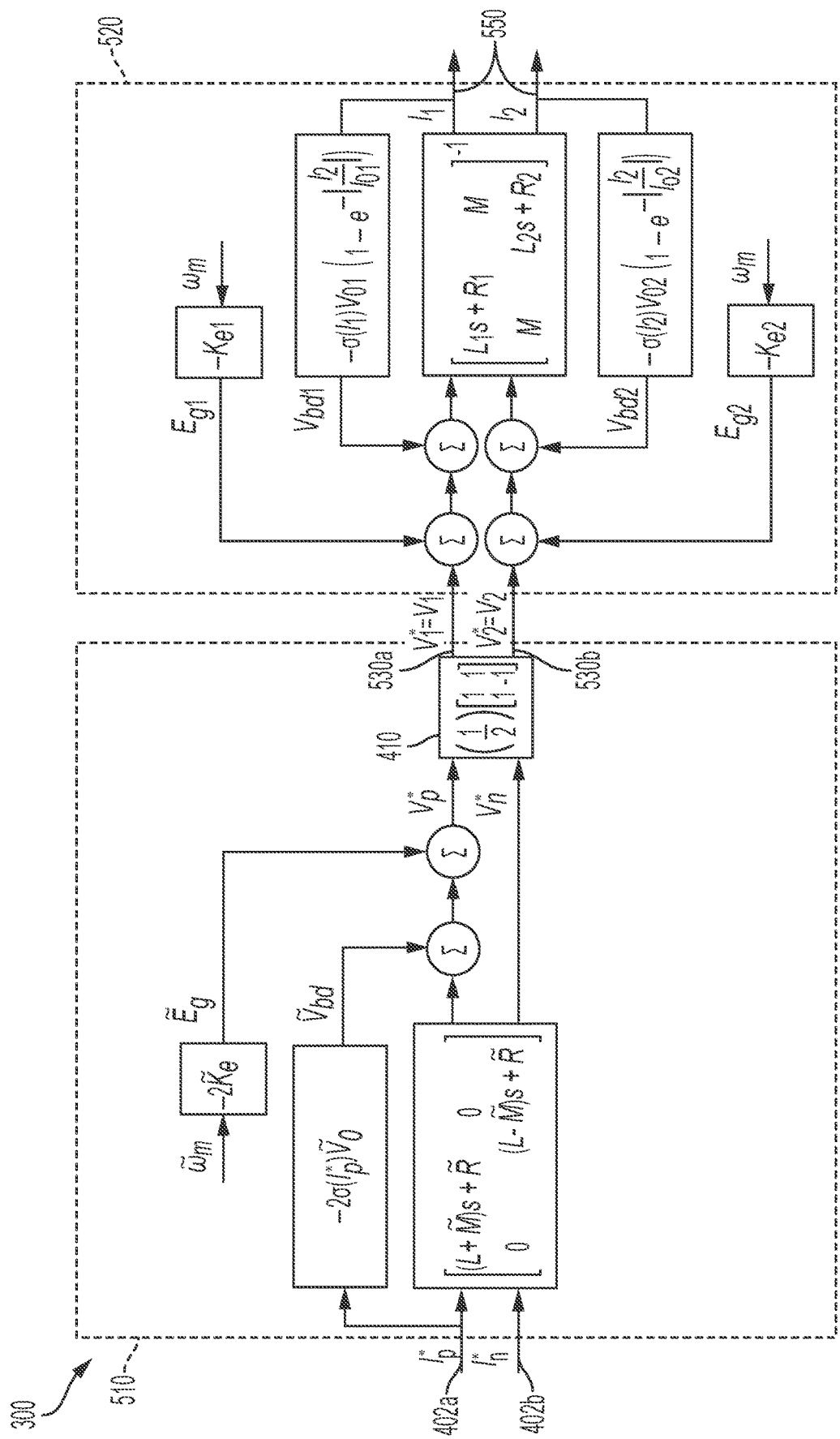
FIG. 5 generally illustrates another block diagram of a system for feedforward current and torque control according to the principles of the present disclosure.

FIG. 5 generally illustrates another exemplary block diagram of the motor control system 300 for feedforward current (and torque) control according to one or more embodiments. This control loop is implemented using an alternative mathematical model of the multi-wound machine generally illustrated in FIG. 5 as follows.

$$\begin{bmatrix} V_+ \\ V_- \end{bmatrix} = \begin{bmatrix} (L+M)s + R & 0 \\ 0 & (L-M)s + R \end{bmatrix} \begin{bmatrix} I_+ \\ I_- \end{bmatrix} + \begin{bmatrix} 2\omega_e \lambda_m + V_{bd+} \\ V_{bd-} \end{bmatrix}$$

$$V_+ = V_1 + V_2 \quad V_- = V_1 - V_2$$

$$I_+ = V_1 + V_2 \quad V_- = V_1 - V_2$$

$$T_e = K_e I_+$$

As generally illustrated in FIG. 5, the control logic is implemented based on the current sum and difference commands which are functions of the individual current commands. The control loop determines voltage sum and difference commands which are then transformed back into individual voltage commands at 410 and applied to the PMDC machine. The current sum control loop includes a feedforward estimate of the motor circuit resistance ($\tilde{R}$), self-inductance ($\tilde{L}$) and mutual-inductance ($\tilde{M}$) values along with a (modified) back-EMF ($\tilde{E}_g$) and brush drop parameters ($\tilde{V}_{bd+}$) while the current difference loop does not include the latter two terms. This alternative mathematical model allows for simplifying the control logic implementation of multi-phase PMDC machines.

Figure 6:
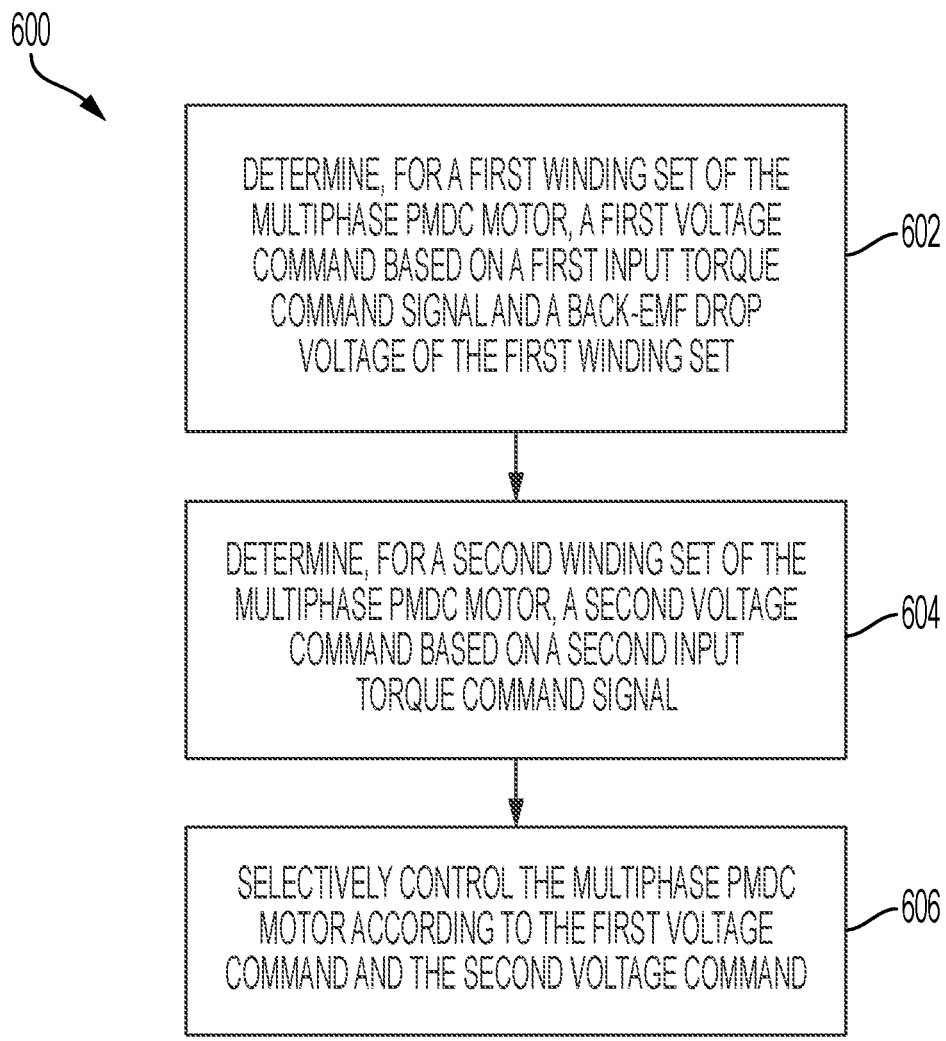
FIG. 6 is a flow diagram generally illustrating a feedforward current and torque control method according to the principles of the present disclosure.

FIG. 6 is a flow diagram generally illustrating a method 600 for controlling a multiphase PMDC motor according to the principles of the present disclosure. At 602, the method 600 determines, for a first winding set of the multiphase PMDC motor, a first voltage command based on a first input torque command signal and a back-EMF drop voltage of the first winding set. For example, the controller 510 determines, for a first winding set of the multiphase PMDC motor, a first voltage command based on a first input torque command signal and a back-EMF drop voltage of the first winding set. At 604, the method 600 determines, for a second winding set of the multiphase PMDC motor, a second voltage command based on a second input torque command signal. For example, the controller 510 determines, for a second winding set of the multiphase PMDC motor, a second voltage command based on a second input torque command signal. At 606, the method 600 selectively control the multiphase PMDC motor according to the first voltage command and the second voltage command. For example, the controller 510 selectively control the multiphase PMDC motor according to the first voltage command and the second voltage command.

In some embodiments, a system for controlling an output torque of a permanent magnet direct current (PMDC) machine, comprises: a PMDC motor configured to generate the output torque, the PMDC motor including a plurality of winding sets; and a controller configured to: determine, for a first winding set of the PMDC motor, a first voltage command based on a first input torque command signal and a back-EMF drop voltage of the first winding set; determine, for a second winding set of the PMDC motor, a second voltage command based on a second input torque command signal; and selectively control the PMDC motor according to the first voltage command and the second voltage command.

In some embodiments, the controller is further configured to determine the first voltage command based on a brush drop voltage of the first winding set.

In some embodiments, the controller is further configured to determine the second voltage command using a brush drop voltage and a back-EMF drop voltage of the second winding set.

In some embodiments, the controller is further configured to determine the first voltage command based on an electrical inductance of an electrical circuit of the PMDC motor and an electrical resistance of the electrical circuit of the PMDC motor.

in some embodiments, the controller is further configured to determine the second voltage command based on an electrical inductance of an electrical circuit of the PMDC motor and an electrical resistance of the electrical circuit of the PMDC motor.

In some embodiments, the controller is further configured to: determine a voltage value based on the first input torque command signal, an electrical inductance of an electrical circuit of the PMDC motor, and an electrical resistance of the electrical circuit of the PMDC motor; and calculate a sum of the voltage value and the back-EMF drop voltage of the first winding set.

In some embodiments, the controller is further configured to determine the first voltage command based on the voltage value and the sum of the voltage value, a brush drop voltage of the first winding set, and the back-EMF drop voltage of the first winding set.

In some embodiments, the controller is further configured to determine the back-EMF drop voltage of the first winding set using a motor velocity signal estimate.

In some embodiments, the controller is further configured to: apply the first voltage command for the first winding set, the first winding set generating a first current in response to the first voltage command; and apply the second voltage command for the second winding set, the second winding set generating a second current in response to the second voltage command; wherein the PMDC motor generates the output torque in response to the first current and the second current.

In some embodiments, the controller is further configured to determine the first voltage command and the second voltage command using a mathematical transformation.

In some embodiments, a controller for controlling an output torque of a multiphase permanent magnet direct current (PMDC) motor is configured to: determine, for a first winding set of the multiphase PMDC motor, a first voltage command based on a first input torque command signal and a back-EMF drop voltage of the first winding set; determine, for a second winding set of the multiphase PMDC motor, a second voltage command based on a second input torque command signal; and selectively control the multiphase PMDC motor according to the first voltage command and the second voltage command.

In some embodiments, the controller is further configured to determine the first voltage command based on a brush drop voltage of the first winding set.

In some embodiments, the controller is further configured to determine the second voltage command using a brush drop voltage and a back-EMF drop voltage of the second winding set.

In some embodiments, the controller is further configured to determine the first voltage command based on an electrical inductance of an electrical circuit of the multiphase PMDC motor and an electrical resistance of the electrical circuit of the multiphase PMDC motor.

In some embodiments, a method for controlling an output torque of a multiphase permanent magnet direct current (PMDC) motor comprises: determining, for a first winding set of the multiphase PMDC motor, a first voltage command based on a first input torque command signal and a back-EMF drop voltage of the first winding set; determining, for a second winding set of the multiphase PMDC motor, a second voltage command based on a second input torque command signal; and selectively controlling the multiphase PMDC motor according to the first voltage command and the second voltage command.

In some embodiments, the method further comprises determining the first voltage command based on a brush drop voltage of the first winding set.

In some embodiments, the method further comprises determining the second voltage command using a brush drop voltage and a back-EMF drop voltage of the second winding set.

In some embodiments, the method further comprises determining the first voltage command based on an electrical inductance of an electrical circuit of the multiphase PMDC motor and an electrical resistance of the electrical circuit of the multiphase PMDC motor.

In some embodiments, the method further comprises determining the back-EMF drop voltage of the first winding set using a motor velocity signal estimate.

In some embodiments, the method further comprises: applying the first voltage command for the first winding set, the first winding set generating a first current in response to the first voltage command; and applying the second voltage command for the second winding set, the second winding set generating a second current in response to the second voltage command; wherein the multiphase PMDC motor generates the output torque in response to the first current and the second current.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A system for controlling an output torque of a permanent magnet direct current (PMDC) machine, comprising:
a PMDC motor configured to generate the output torque, the PMDC motor including a plurality of winding sets; and a controller configured to:
  determine, for a first winding set of the PMDC motor, a first voltage command based on a first input torque command signal and a back-EMF drop voltage of the first winding set;
  determine, for a second winding set of the PMDC motor, a second voltage command based on a second input torque command signal; and
  selectively control the PMDC motor according to the first voltage command and the second voltage command.

2. The system of claim 1, wherein the controller is further configured to determine the first voltage command based on a brush drop voltage of the first winding set.

3. The system of claim 1, wherein the controller is further configured to determine the second voltage command using a brush drop voltage and a back-EMF drop voltage of the second winding set.

4. The system of claim 1, wherein the controller is further configured to determine the first voltage command based on an electrical inductance of an electrical circuit of the PMDC motor and an electrical resistance of the electrical circuit of the PMDC motor.

5. The system of claim 1, wherein the controller is further configured to determine the second voltage command based on an electrical inductance of an electrical circuit of the PMDC motor and an electrical resistance of the electrical circuit of the PMDC motor.

6. The system of claim 1, wherein the controller is further configured to:
  determine a voltage value based on the first input torque command signal, an electrical inductance of an electrical circuit of the PMDC motor, and an electrical resistance of the electrical circuit of the PMDC motor; and
  calculate a sum of the voltage value and the back-EMF drop voltage of the first winding set.

7. The system of claim 6, wherein the controller is further configured to determine the first voltage command based on the voltage value and the sum of the voltage value, a brush drop voltage of the first winding set, and the back-EMF drop voltage of the first winding set.

8. The system of claim 1, wherein the controller is further configured to determine the back-EMF drop voltage of the first winding set using a motor velocity signal estimate.

9. The system of claim 1, wherein the controller is further configured to:
  apply the first voltage command for the first winding set, the first winding set generating a first current in response to the first voltage command; and
  apply the second voltage command for the second winding set, the second winding set generating a second current in response to the second voltage command; wherein the PMDC motor generates the output torque in response to the first current and the second current.

10. The system of claim 1, wherein the controller is further configured to determine the first voltage command and the second voltage command using a mathematical transformation.

11. A controller for controlling an output torque of a multiphase permanent magnet direct current (PMDC) motor, the controller configured to:
  determine, for a first winding set of the multiphase PMDC motor, a first voltage command based on a first input torque command signal and a back-EMF drop voltage of the first winding set;
  determine, for a second winding set of the multiphase PMDC motor, a second voltage command based on a second input torque command signal; and
  selectively control the multiphase PMDC motor according to the first voltage command and the second voltage command.

12. The controller of claim 11, wherein the controller is further configured to determine the first voltage command based on a brush drop voltage of the first winding set.

13. The controller of claim 11, wherein the controller is further configured to determine the second voltage command using a brush drop voltage and a back-EMF drop voltage of the second winding set.

14. The controller of claim 11, wherein the controller is further configured to determine the first voltage command based on an electrical inductance of an electrical circuit of the multiphase PMDC motor and an electrical resistance of the electrical circuit of the multiphase PMDC motor.

15. A method for controlling an output torque of a multiphase permanent magnet direct current (PMDC) motor, the method comprising:
  determining, for a first winding set of the multiphase PMDC motor, a first voltage command based on a first input torque command signal and a back-EMF drop voltage of the first winding set;
  determining, for a second winding set of the multiphase PMDC motor, a second voltage command based on a second input torque command signal; and
  selectively controlling the multiphase PMDC motor according to the first voltage command and the second voltage command.

16. The method of claim 15, further comprising determining the first voltage command based on a brush drop voltage of the first winding set.

17. The method of claim 15, further comprising determining the second voltage command using a brush drop voltage and a back-EMF drop voltage of the second winding set.

18. The method of claim 15, the method further comprising determining the first voltage command based on an electrical inductance of an electrical circuit of the multiphase PMDC motor and an electrical resistance of the electrical circuit of the multiphase PMDC motor.

19. The method of claim 15, the method further comprising determining the back-EMF drop voltage of the first winding set using a motor velocity signal estimate.

20. The method of claim 15, the method further comprising:
  applying the first voltage command for the first winding set, the first winding set generating a first current in response to the first voltage command; and
  applying the second voltage command for the second winding set, the second winding set generating a second current in response to the second voltage command: wherein the multiphase PMDC motor generates the output torque in response to the first current and the second current.

* * * * *